United States Patent
Hart et al.

(10) Patent No.: US 7,328,391 B2
(45) Date of Patent: Feb. 5, 2008

(54) ERROR CORRECTION WITHIN A CACHE MEMORY

(75) Inventors: David Kevin Hart, Cambridge (GB); Patrick Gerard McGlew, Cambridge (GB); Andrew Burdass, Cambridge (GB)

(73) Assignee: ARM Limited, Cambridge (GB)

( * ) Notice: Subject to any disclaimer, the term of this patent is extended or adjusted under 35 U.S.C. 154(b) by 565 days.

(21) Appl. No.: 10/880,618

(22) Filed: Jul. 1, 2004

(65) Prior Publication Data

US 2005/0188249 A1   Aug. 25, 2005

(30) Foreign Application Priority Data

Dec. 18, 2003   (GB) ................................ 0329326.3

(51) Int. Cl.
*H03M 13/00* (2006.01)

(52) U.S. Cl. .................................................... 714/753

(58) Field of Classification Search .................. 714/753
See application file for complete search history.

(56) References Cited

U.S. PATENT DOCUMENTS

| 4,995,041 | A | * | 2/1991 | Hetherington et al. ...... 714/763 |
| 5,912,906 | A | | 6/1999 | Wu et al. .................... 714/763 |
| 6,014,756 | A | | 1/2000 | Dottling et al. ............... 714/15 |
| 7,065,681 | B2 | * | 6/2006 | Quach .......................... 714/52 |
| 2003/0131277 | A1 | | 7/2003 | Taylor et al. ................... 714/5 |

* cited by examiner

*Primary Examiner*—Shelly Chase
(74) *Attorney, Agent, or Firm*—Nixon & Vanderhye P.C.

(57) ABSTRACT

A cache memory includes error bits corresponding to each line of data. An error detecting circuit uses these error bits to detect if a soft error has occurred within the data of a cache line. If such an error has occurred, then the line may be refilled from the main memory or some other action taken, such as a write back or generation of a soft error abort signal.

38 Claims, 3 Drawing Sheets

| Data Error | TAG Error | Valid Error | Dirty Error | Valid | Dirty | Action |
|---|---|---|---|---|---|---|
| ✓ | - | - | - | ✓ | X | Refill |
| - | ✓ | - | - | ✓ | X | Refill |
| ✓ | - | - | - | X | X | Ignore |
| - | ✓ | - | - | X | X | Ignore |
| ✓ | - | - | - | ✓ | ✓ | Abort |
| - | ✓ | - | - | ✓ | ✓ | Abort |
| - | - | ✓ | - | ? | X | Invalidate |
| - | - | ✓ | - | ? | ✓ | WB |
| - | - | - | ✓ | X | ? | Ignore |
| - | - | - | ✓ | ✓ | ? | WB |

Note: Valid + Dirty is Impossible

REFILL = $E_{data}.V.\overline{D} \vee E_{tag}.V.\overline{D}.\overline{H}$

ABORT = $E_{data}.V.D \vee E_{tag}.V.D$

INVALDATE = $E_{valid}.\overline{D} \vee E_{tag}.V.\overline{D}.H$

WB = $E_{valid}.D \vee E_{dirty}.V.D$

ERROR CORRECTION WITHIN A CACHE MEMORY

BACKGROUND OF THE INVENTION

1. Field of the Invention

This invention relates to the field of data processing systems. More particularly, this invention relates to the correction of errors which occur within bit values held in a cache memory, such as, for example, soft errors caused by ionising radiation.

2. Description of the Prior Art

It is known to provide data processing systems with cache memories for the reason of improving processing performance. These cache memories are typically becoming greater in storage capacity and together with the other elements within integrated circuits are tending to be fabricated using smaller circuit geometries. As a consequence of this, cache memories are becoming increasingly prone to so called "soft errors", such as those which may occur due to the impact or passage of ionising radiation. Such soft errors cause inappropriate change in one or more bit values stored within the cache memory.

Errors of this type can be particularly significant in critical and/or safety related systems, e.g. within the processor controlling an anti-lock braking system. Within such systems, high degrees of reliability are required and should be demonstrable.

One known system for handling soft errors within cache memories is described in U.S. Pat. No. 6,332,181. In this system detection of an error results in triggering of a software error handling mechanism. In the context of a critical system in which this type of error detecting and error correcting mechanism is desirable, the slowness of a software mechanism for handling such errors is a significant disadvantage, e.g. an anti-lock braking system or engine management system might be disable from its normal function for several hundred or thousand processing cycles while such an error is dealt with in software.

SUMMARY OF THE INVENTION

Viewed from one aspect the present invention provides a cache memory comprising:

a plurality of cache lines each operable to store a line of data and one or more error checking bits for said cache line;

an error checking circuit operable to error check at least a portion of a cache line being accessed using one or more of said one or more error checking bits; and an error handling circuit operable if said error checking circuit detects an error within said portion of a cache line to trigger a refill of at least said portion of a cache line from a main memory.

The present invention recognises the speed problem associated with purely software handling of such errors and provides a mechanism whereby such errors are not only detected in hardware but they may also be repaired in hardware using a simple cache line refill. The nature of cache memory is that it often holds a copy of data which has not been altered whilst in the cache memory and so a duplicate exists in main memory which can be readily refilled into the damaged cache line rapidly and effectively repairing the error which has occurred. The hardware error handling mechanism also requires advantageously little additional circuitry since the mechanisms for refilling a cache line are typically already provided for use during normal operation. The additional circuitry needed for the hardware may also be less than that which would be required to store exception handling code of which the functionality has been replaced by the hardware.

Whilst it will be appreciated that the refill of the cache line could be a partial refill of the portion containing the error, in many embodiments it is advantageously simple merely to refill a full cache line of which any portion is in error.

An additional complication arises in the context of write back caches where dirty bits are employed to indicate that the content of the cache has changed and has not yet been written back to the main memory. In the context of such systems, the error handling circuit does not trigger a refill if the cache line or portion of a cache line concerned is indicated as being dirty since the data which would be refilled into the cache line would be out-of-date.

It is possible that a single dirty bit could be provided for a full cache line, or alternatively two or more dirty bits provided per cache line and corresponding to respective portions of the data within the cache line.

A balance needs to be struck between the space occupied by error checking bits and the granularity with which they allow an error to be identified. In preferred embodiments of the invention, a plurality of error checking bits are provided for each cache line.

The error checking bits may take a variety of different forms depending on the particular nature of the bits within the cache line to which they are adding error checking capability, and in particular may be parity bits, duplicate bits, checksum bits and/or error correcting code bits.

As previously mentioned if any dirty bits are set within a portion of a cache line containing an error, then a simple refill is not possible and in such circumstances the system serves to trigger software error handling where a more complex approach may be taken, or alternatively the whole system may simply be reset as the error is unrecoverable.

It will be appreciated in the context of cache memories that data TAGs will be present and if an error occurs within such a data TAG, then the cache line concerned may be refilled since it is not useful with its erroneous TAG and the space can be used by some other data, e.g. if the error checking is performed upon a cache access, then a hit to a line with the corrupted TAG indicates that the line that has that TAG is genuinely required and may advantageously be refilled into the cache line with the corrupted TAG which incorrectly gave the hit.

The previously mentioned dirty bits may themselves be subject to errors and are provided with error checking bits. If such an error occurs, then a write back of the cache line to the main memory is triggered.

Cache lines may also have associated valid bits, either a valid bit for the whole cache line or multiple valid bits per cache line. Such valid bits may be subject to error and are provided with corresponding error checking bits. When an error is detected in a valid bit, then if the cache line is dirty, a write back is triggered, and if the cache line is not dirty, a refill of the cache line is triggered.

The cache memory may take many different forms including a data cache memory, an instruction cache memory, a unified cache memory or a Harvard cache memory.

The error checking bits are conveniently calculated and updated into the cache line as that cache line is written.

Viewed from another aspect the present invention provides a method of correcting a soft error within a cache memory, said method comprising the steps of:

storing within each of a plurality of cache lines a line of data and one or more error checking bits for said cache line;

error checking at least a portion of a cache line being accessed using one or more of said one or more error checking bits; and if said error checking detects an error within said portion of a cache line hardware triggering a refill of at least said portion of a cache line from a main memory.

The above, and other objects, features and advantages of this invention will be apparent from the following detailed description of illustrative embodiments which is to be read in connection with the accompanying drawings.

DESCRIPTION OF THE PREFERRED EMBODIMENTS

Figures 1, 2:
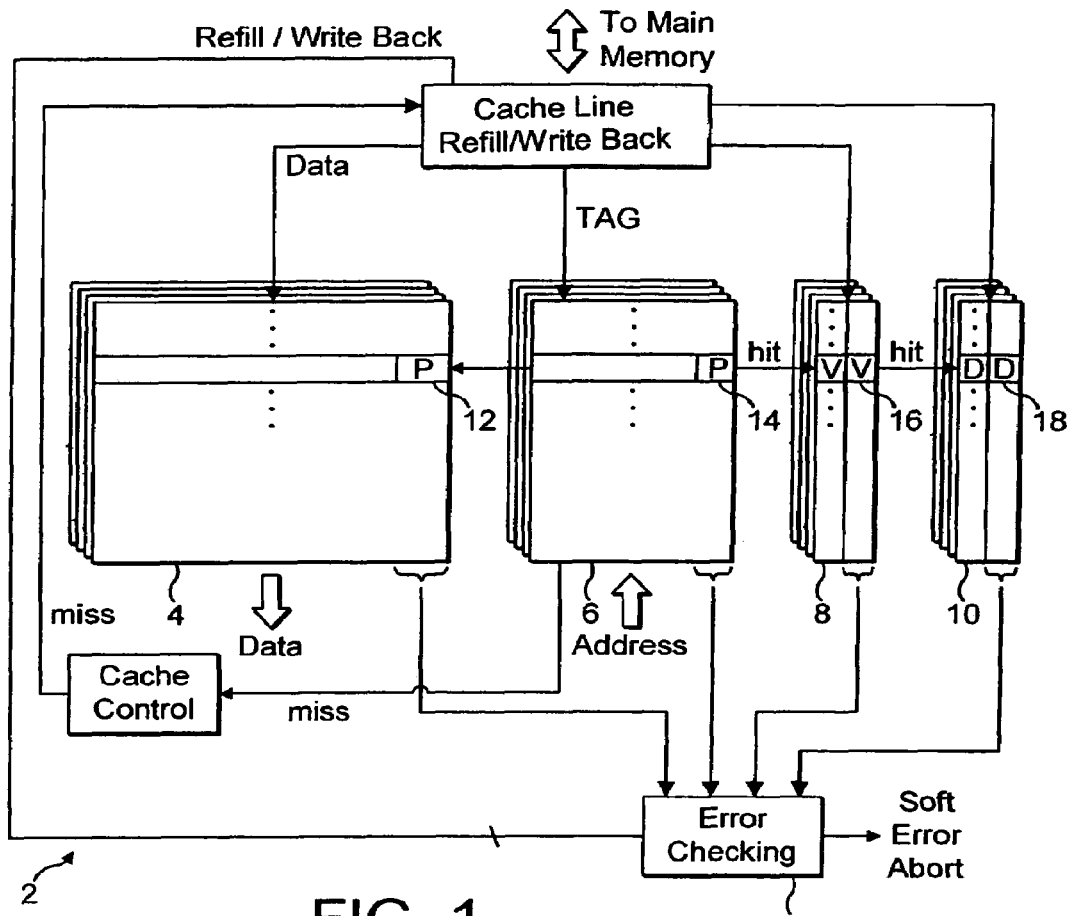
FIG. 1 schematically illustrates a 4-way cache memory incorporating error checking bits, an error detecting circuit and an error handling circuit.
FIG. 2 is a table showing actions to be triggered in the event of specified errors.

FIG. 1 illustrates a cache memory 2. This illustrated example is a 4-way data cache memory. The present techniques may be used with both single way and multiple way caches. The present technique is also applicable to other types of cache memory such as non-associative caches, instruction caches, Harvard caches, unified caches and the like. As illustrated in FIG. 1, the cache 2 includes a data portion 4, a TAG portion 6, a valid bit portion 8 and a dirty bit portion 10. This basic type of cache arrangement together with non error related mechanisms for refilling, writing back and controlling such a cache are known in this technical field and will not be described further herein.

The present technique builds upon the known form of cache memory by adding error checking bits to each cache line. More particularly, parity bits 12 are added to the data portion 4. In this example embodiment, there are eight parity bits per double-word giving thirty two parity bits for a thirty two byte cache line. Parity bits 14 are also added to the TAG portion 6. Since the TAG portion 6 is much smaller than the data portion 4, only three parity bits are needed in respect of the TAG portion 6. A duplicate valid bit 16 and a duplicate dirty bit 18 are also added to the respective valid bit portion 8 and dirty bit portion 10 of the cache 2. When the cache 2 is being accessed and a value read therefrom, it is error checked by an error checking circuit 20 using the error checking bits 12, 14, 16, 18. The parity bits 12, 14 may be checked against a corresponding eight bits of which they represent the parity using an XOR tree. The duplicate valid bit 16 and the duplicate dirty bit 18 can be checked against their corresponding valid bit and dirty bit. Depending upon the error detected and the state of the cache line concerned, the error checking circuit 20 can also serve as the error handling circuit to trigger an appropriate response, such as a cache line refill or write back operation or the issuing of a soft error abort signal to trigger an interrupt handler dedicated to soft error aborts.

FIG. 2 is a table showing the different responses which can be triggered by the error detecting and error handling circuit 20. In particular refill operations, write back (WB) operations and invalidation of the line concern may be triggered together with issue of the soft error abort signal. It is also possible that in some situations an error will be ignored since the line concerned is not valid.

The top two entries in the table indicate detection of an error within the data or the TAG in the circumstance where the cache line concerned is valid and not dirty. In the case of a data error, a refill operation is performed whereby the correct data is fetched from the main memory and refilled into the cache line having the error. This is quick and effective resulting in little loss of processing time and a proper recovery. In the case of the TAG being in error a refill of the cache line will be performed since the hit onto that cache occurred because the data was required by the processor but the TAG match was erroneous since the TAG has been corrupted. However, the data is still required and so refilling that data will remove the erroneous cache line and satisfy the need for the data being sought. An exception to this is if multiple ways report a TAG match and in this circumstance the cache line holding the erroneous TAG should be invalidated rather than refilled since the data concerned is already present in the other non-erroneous cache way in which the match occurred.

The fifth and sixth lines in the table indicate respective data and TAG errors occurring where the cache line is valid and dirty. These type of errors are not easy to recover from and the hardware generates a soft error abort interrupt signal to allow software handling of these errors, such as by resetting the system, or at least the process concerned.

Since the data and TAG physically occupy a preponderance of the bits storage associated with a cache line, these are overwhelmingly the most likely place where a soft error will occur. However, it is possible that soft errors may occur in the valid bit or dirty bit of a cache line. FIG. 2 illustrates actions which may be taken in the circumstances. It will be appreciated that the occurrence of multiple errors simultaneously is a statistically highly unlikely occurrence and useful embodiments of the present technique may simply not deal with such occurrences and reply upon their extreme rareness. An alternative would be to detect the occurrence of multiple errors and force a system reset in such circumstances.

Figure 3:
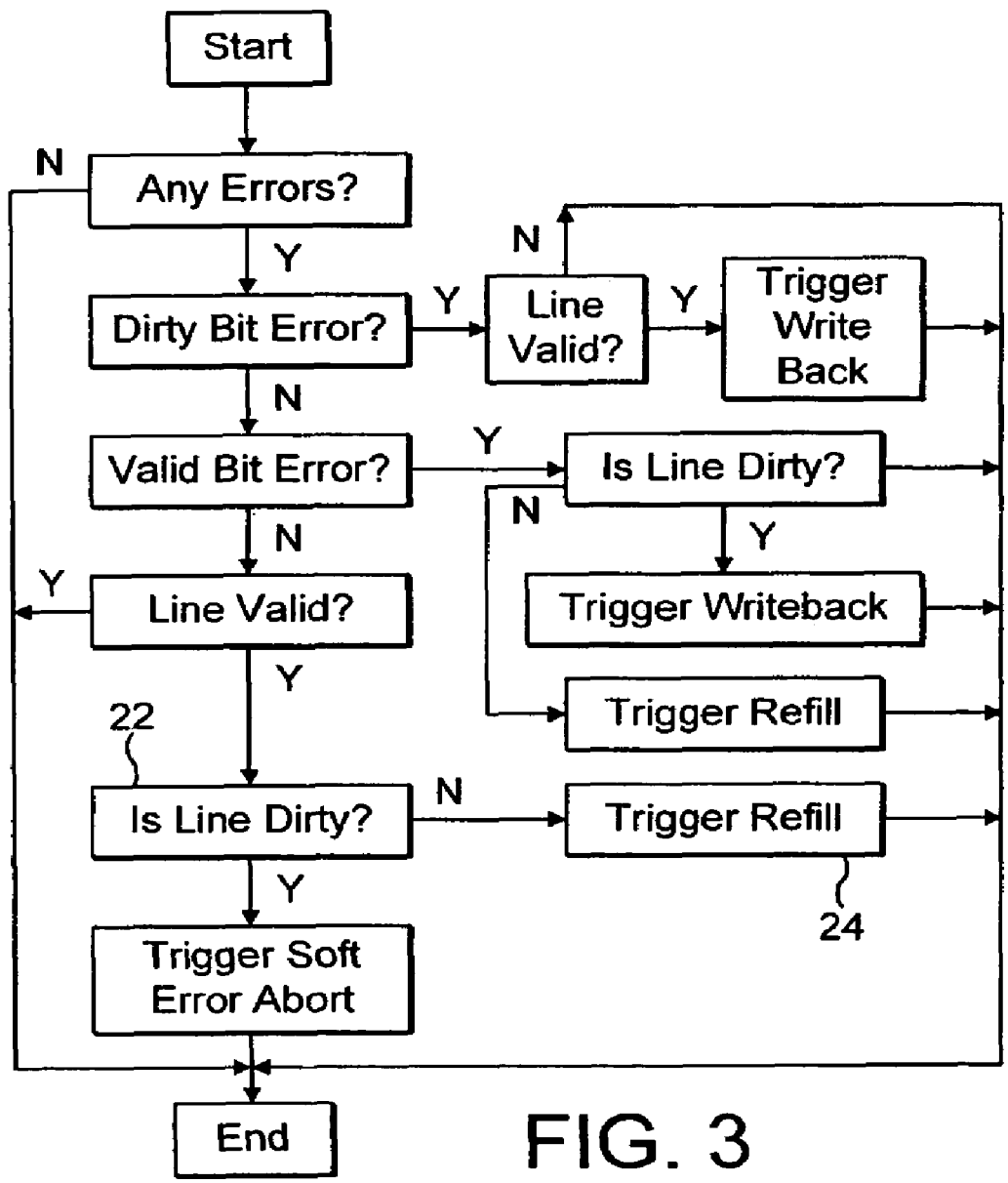
FIG. 3 is a flow diagram schematically illustrating a simplified form of the error handling selection mechanism.

FIG. 3 is a flow diagram schematically illustrating how errors which occur may be analysed to detect the appropriate course of action in line with those of FIG. 2. Once an error of any form has been detected, then these are examined further to determine if a dirty bit error has occurred, a valid bit error has occurred or whether the error must necessarily be a data or TAG error. In the case of the handling of a dirty bit error, the valid bit should also be set otherwise the dirty bit error can be ignored. The same is also true in correction of a data or TAG error. In the case of a data or TAG error as indicated by processing reaching step 22, if the cache line is not dirty, then a cache line refill operation is triggered at step 24 controlled and performed by hardware mechanisms.

Figures 4, 5:
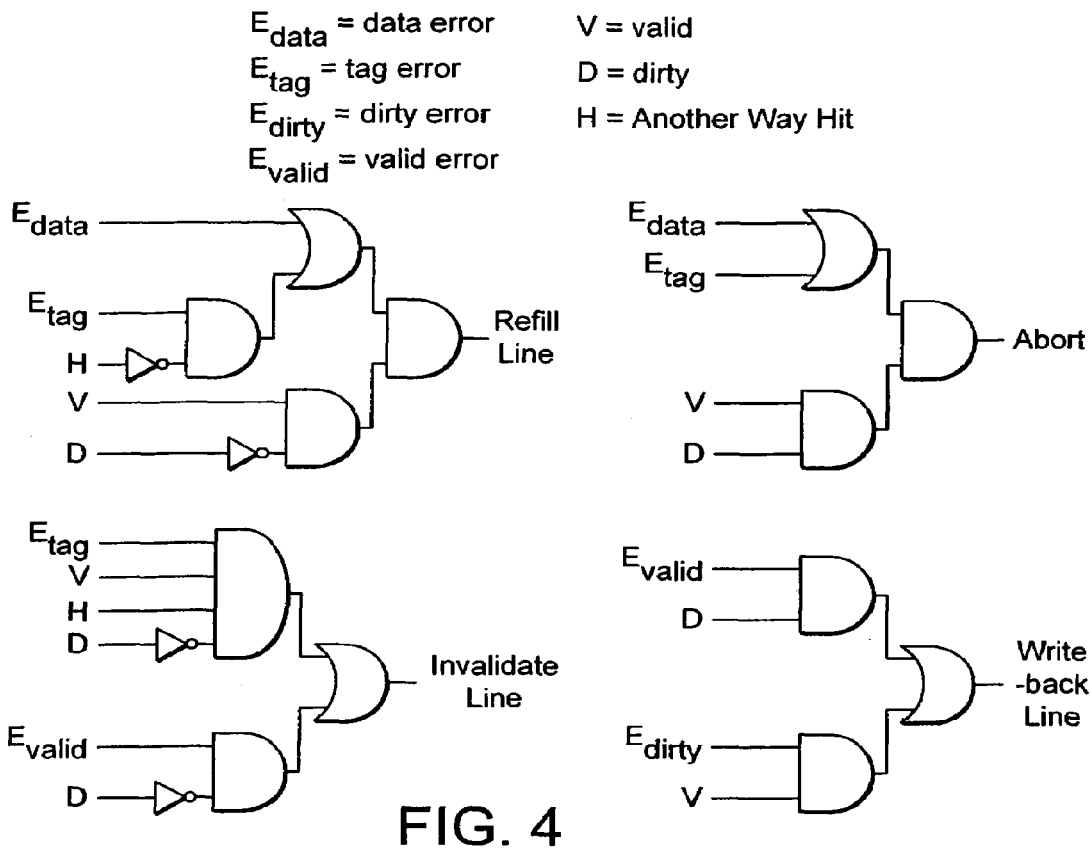
FIG. 4 illustrates hardware circuits for triggering differing responses upon occurrence of various error condition combinations.
FIG. 5 illustrates algebraic expressions of the evaluations performed by the circuits of FIG. 4.

FIG. 4 illustrates circuits which may be provided within the error detecting circuit and error handling circuit 20 to trigger differing error responses in the appropriate situations as set out in FIG. 2. It will be seen that the logical combinations of signals which occur are relatively straightforward making this technique efficient and rapid to implement.

FIG. 5 is an algebraic representation of the evaluations performed by the circuits of FIG. 4.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A cache memory comprising:
   a plurality of cache lines each operable to store a line of data and one or more error checking bits for said cache line;
   an error checking circuit operable to error check at least a portion of a cache line being accessed using one or more of said one or more error checking bits; and
   an error handling circuit operable if said error checking circuit detects an error within said portion of a cache line to trigger a refill of at least said portion of a cache line from a main memory,
   wherein each cache line also stores one or more dirty bits for said line of data, a set dirty bit being indicative of a corresponding portion of said line of data having been changed since it was read from said main memory and not yet written back to said main memory.

2. A cache memory as claimed in claim 1, wherein said refill is of a full cache line containing said portion of a cache line.

3. A cache memory as claimed in claim 1, wherein said error handling circuit does not trigger said refill if any dirty bits corresponding to said portion of a cache line are set.

4. A cache memory as claimed in claim 3, wherein if any dirty bits corresponding to said portion of a cache line are set, then said error handling circuit triggers execution of a software error handling routine.

5. A cache memory as claimed in claim 1, wherein a single dirty bit corresponds to a complete line of data.

6. A cache memory as claimed in claim 1, wherein a plurality of dirty bits corresponds to respective ones of a plurality of portions of said line of data.

7. A cache memory as claimed in claim 1, wherein a plurality of error checking bits correspond to a cache line.

8. A cache memory as claimed in claim 1, wherein said one or more error checking bits are one or more of:
   parity bits;
   duplicate bits;
   checksum bits; and
   error correcting code bits.

9. A cache memory as claimed in claim 1, wherein said cache memory is a multiple way cache memory, said line of data includes one or more data words and a data TAG and if said error detecting circuit detects an error in said data TAG when more than one TAG match for said cache line has occurred, then said cache line is invalidated.

10. A cache memory as claimed in claim 1, wherein each cache line stores at least one error checking bit for said one or more dirty bits and said error handling circuit is responsive to detection of an error in an error checking bit for said one or more dirty bits to trigger a write back of said cache line to said main memory.

11. A cache memory as claimed in claim 1, wherein each cache line stores a valid bit, a set valid bit being indicative of said cache line storing valid data.

12. A cache memory as claimed in claim 11, wherein an error detected in a cache line for which a corresponding valid bit is non-erroneous and indicates invalidity is ignored.

13. A cache memory as claimed in claim 1, wherein each cache line stores a plurality of valid bits, a set valid bit being indicative of a corresponding portion of said cache line storing valid data.

14. A cache memory as claimed in claim 1, wherein each cache line stores an error checking bit for each valid bit and said error handling circuit is responsive to detection of an error in any error checking bit for any valid bit to trigger:
   (i) a write back of said cache line to said main memory, if a dirty bit is set for any portion of said cache line; and
   (ii) a refill of said cache line from said main memory, if no dirty bit is set for any portion of said cache line.

15. A cache memory as claimed in claim 1, wherein said cache memory is one of:
   (i) a data cache memory;
   (ii) an instruction cache memory;
   (iii) a unified cache memory; and
   (iv) a Harvard cache memory.

16. A cache memory as claimed in claim 1, wherein at least some of said one or more error checking bits are updated when said cache line is written.

17. A cache memory comprising:
   a plurality of cache lines each operable to store a line of data and one or more error checking bits for said cache line;
   an error checking circuit operable to error check at least a portion of a cache line being accessed using one or more of said one or more error checking bits; and
   an error handling circuit operable if said error checking circuit detects an error within said portion of a cache line to trigger a refill of at least said portion of a cache line from a main memory,
   wherein said line of data includes one or more data words and a data TAG and if said error detecting circuit detects an error in said data TAG, then said error handling circuit triggers a refill of said cache line.

18. The cache memory as claimed in claim 17, wherein each cache line also stores one or more dirty bits for said line of data, a set dirty bit being indicative of a corresponding portion of said line of data having been changed since it was read from said main memory and not yet written back to said main memory.

19. The cache memory as claimed in claim 18, wherein said error handling circuit does not trigger said refill if any dirty bits corresponding to said portion of a cache line are set.

20. A method of correcting a soft error within a cache memory, said method comprising:
   storing within each of a plurality of cache lines a line of data and one or more error checking bits for said cache line;
   error checking at least a portion of a cache line being accessed using one or more of said one or more error checking bits; and
   if said error checking detects an error within said portion of a cache line hardware triggering a refill of at least said portion of a cache line from a main memory,
   wherein each cache line also stores one or more dirty bits for said line of data, a set dirty bit being indicative of a corresponding portion of said line of data having been changed since it was read from said main memory and not yet written back to said main memory.

21. A method as claimed in claim 20, wherein said refill is of a full cache line containing said portion of a cache line.

22. A method as claimed in claim 20, wherein said refill is not triggered if any dirty bits corresponding to said portion of a cache line are set.

23. A method as claimed in claim 22, wherein if any dirty bits corresponding to said portion of a cache line are set, then execution of a software error handling routine is triggered.

24. A method as claimed in claim 20, wherein a single dirty bit corresponds to a complete line of data.

25. A method as claimed in claim 20, wherein a plurality of dirty bits corresponds to respective ones of a plurality of portions of said line of data.

26. A method as claimed in claim 20, wherein a plurality of error checking bits correspond to a cache line.

27. A method as claimed in claim 20, wherein said one or more error checking bits are one or more of:
   parity bits;
   duplicate bits;
   checksum bits; and
   error correcting code bits.

28. A method as claimed in claim 20, wherein said cache memory is a multiple way cache memory, said line of data includes one or more data words and a data TAG and if said error detecting circuit detects an error in said data TAG when more than one TAG match for said cache line has occurred, then said cache line is invalidated.

29. A method as claimed in claim 20, wherein each cache line stores at least one error checking bit for said one or more dirty bits and in response to detection of an error in an error checking bit for said one or more dirty bits, a write back of said cache line to said main memory is triggered.

30. A method as claimed in claim 20, wherein each line stores a valid bit, a set valid bit being indicative of said cache line storing valid data.

31. A method as claimed in claim 30, wherein an error detected in a cache line for which a corresponding valid bit is non-erroneous and indicates invalidity is ignored.

32. A method as claimed in claim 20, wherein each cache line stores a plurality of valid bits, a set valid bit being indicative of a corresponding portion of said cache line storing valid data.

33. A method as claimed in claim 20, wherein each cache line stores an error checking bit for each valid bit and in response to detection of an error in any error checking bit for any valid bit:
   (i) a write back of said cache line to said main memory is triggered, if a dirty bit is set for any portion of said cache line; and
   (ii) a refill of said cache line from said main memory is triggered, if no dirty bit is set for any portion of said cache line.

34. A method as claimed in claims 20, wherein said cache memory is one of:
   (i) a data cache memory;
   (ii) an instruction cache memory;
   (iii) a unified cache memory; and
   (iv) a Harvard cache memory.

35. A method as claimed in claim 20, wherein said one or more error checking bits are updated when said cache line is written.

36. A method of correcting a soft error within a cache memory, said method comprising:
   storing within each of a plurality of cache lines a line of data and one or more error checking bits for said cache line;
   error checking at least a portion of a cache line being accessed using one or more of said one or more error checking bits; and
   if said error checking detects an error within said portion of a cache line hardware triggering a refill of at least said portion of a cache line from a main memory,
   wherein said line of data includes one or more data words and a data TAG and if an error is detected in said data TAG, then a refill of said cache line is triggered.

37. A method as claimed in claim 36, wherein each cache line also stores one or more dirty bits for said line of data, a set dirty bit being indicative of a corresponding portion of said line of data having been changed since it was read from said main memory and not yet written back to said main memory.

38. A method as claimed in claim 37, wherein said refill is not triggered if any dirty bits corresponding to said portion of a cache line are set.

* * * * *